United States Patent [19]
Buhro et al.

[11] Patent Number: 5,440,336
[45] Date of Patent: Aug. 8, 1995

[54] SYSTEM AND METHOD FOR STORING AND FORWARDING AUDIO AND/OR VISUAL INFORMATION ON DEMAND

[75] Inventors: William R. Buhro, Plano; Ernest W. Radowick, McKinney, both of Tex.; John E. Rogers, Dayton, Ohio

[73] Assignee: Electronic Data Systems Corporation, Plano, Tex.

[21] Appl. No.: 96,098

[22] Filed: Jul. 23, 1993

[51] Int. Cl.⁶ ............................................. H04M 11/00
[52] U.S. Cl. ............................................ 348/13; 348/7; 348/12; 455/5.1
[58] Field of Search ................... 455/4.1, 4.2, 5.1, 6.1, 455/6.3, 3.1, 3.2; 348/7, 8, 12, 6, 13, 409

[56] References Cited

U.S. PATENT DOCUMENTS

| | | | |
|---|---|---|---|
| 4,829,560 | 5/1989 | Evanyk et al. | 379/106 |
| 5,119,188 | 6/1992 | McCalley et al. | 455/4.1 |
| 5,130,792 | 7/1992 | Tindell et al. | 358/85 |
| 5,132,992 | 7/1992 | Yurt et al. | 375/122 |
| 5,133,079 | 7/1992 | Ballantyne et al. | 455/4.1 |
| 5,247,347 | 9/1993 | Litteral et al. | 348/7 |
| 5,253,078 | 10/1993 | Balkanski et al. | 348/409 |
| 5,253,275 | 10/1993 | Yurt et al. | 455/5.1 |
| 5,262,875 | 11/1993 | Mincer et al. | 348/6 |

*Primary Examiner*—Wing F. Chan
*Assistant Examiner*—Stella L. Woo
*Attorney, Agent, or Firm*—L. Joy Griebenow

[57] ABSTRACT

A system and method for storing and forwarding audio/video signals on demand is shown including an encoder for receiving, digitizing, and compressing audio/video signals into a data stream, and a first processing system for further compressing and storing the data stream received from the encoder, and for later transmitting the data stream via a transmitting system to a location remote from the first processing system. The first processing system preferably also includes a microprocessor. The second processing system includes a microprocessor for receiving, processing, and storing the data stream from the remote first processing system, and later transmitting a copy of the data stream, upon receipt of a request for replay of the audio/video signal after retrieving and decompressing the copy of the data stream. Such system and method also includes a decoder for further decompressing and transforming the data stream into an analog signal for transmission to at least one television set for replay.

46 Claims, 7 Drawing Sheets

───── FIXED LENGTH RECORDS ─────

DATA FLOW – INPUT ─────────────▶

| G | F | E | D | C | B | A | SYNC | RECORD 1
| G | F | E | D | C | B | A | SYNC | RECORD N

DATA STORED ON DISK

| C | B | · · · | C | B | C | B |
RECORD N        RECORD 2   RECORD 1

DATA FLOW – OUTPUT ─────────────▶

| FILL | FILL | FILL | FILL | C | B | FILL | SYNC | RECORD 1
| FILL | FILL | FILL | FILL | C | B | FILL | SYNC | RECORD N

DATA FORMAT A

*FIG. 6a*

───── VARIABLE LENGTH RECORDS ─────

DATA FLOW – INPUT/OUTPUT ─────────────▶

| ERROR | COUNT | C | B | SYNC | RECORD 1
| ERROR | COUNT | C | B | SYNC | RECORD N

DATA STORED ON DISK

| C | B | · · · | C | B | C | B |
RECORD N        RECORD 2   RECORD 1

DATA FORMAT B

*FIG. 6b*

SYSTEM AND METHOD FOR STORING AND FORWARDING AUDIO AND/OR VISUAL INFORMATION ON DEMAND

BACKGROUND OF THE INVENTION

1. Field of the Invention

The present invention relates generally to transmission and storage of digital information, and more particularly to a system and method for storing and forwarding audio and/or visual information for display on demand at a remote location.

2. Description of the Related Art

Viewing of various types of video programs has become increasingly popular. Typical video programs include motion pictures, entertainment produced for television as well as education and training programs. An extremely wide variety of programs have been designed or adapted for viewing on standard television sets.

Currently electromagnetic tapes of commercial movies are copied by the tens of thousands and distributed to a variety of users such as hotels, hospitals, stores, and other businesses, which is extremely labor-intensive and expensive to maintain. For example, a hotel plays a movie on its VCR system at specified starting times, and guests of the hotel desiring to watch the particular movie merely tune in at the designated time on the predetermined channel. If the guest tunes the room television to the movie, a charge is added to the room bill.

The logistics of movie tape distribution severely limits the number of movies which are economically feasible to show during any particular period of time. Most hotels play an average of eight movies each month due to limited capacity. Moreover, a videotape degrades each time it is played, so the quality of the picture noticeably deteriorates toward the end of the month.

In an effort to enable hotel guests to have video on demand, some suppliers have racked together numerous (normally 32–128 decks, depending on the number of rooms at a hotel) tape decks. Obviously, such an arrangement is quite labor intensive and expensive to maintain. Each tape deck contains an electromagnetic tape copy of a different movie which the on-site system activates when a guest requests to view the particular movie on their room television. However, if a guest from another room wishes to see the same movie at some time during the movie's playback, that guest is informed that the movie selected is currently unavailable, unless the guest wishes to join the movie in progress. If the guest chooses to join the movie in progress, they are still charged the full price for the movie as if they had viewed it in its entirety.

Similarly, a couple of multi-media platforms offer some form of limited video on demand or animation in a video form from a server. Nevertheless, these platforms not only fail to provide VHS resolution quality video programs, they tend to be quite expensive and lack an external interface enabling another computer or program to control such platforms' operation. Moreover, a new user often must wait until the platform returns to a particular setting in its program before it is ready for interaction with the new user.

SUMMARY OF THE INVENTION

In view of the above problems associated with the related art, it is an object of the present invention to provide a system and method for tapeless transferring of digital information from a first location to a remote location, which provides system accountability.

It is another object of the present invention to provide an automated system and method for storing and forwarding desired audio and/or video information truly on demand and in a cost-effective manner.

It is yet another object of the present invention to provide a system and method for providing full-length video on demand at better than VHS resolution quality.

It is a further object of the present invention to provide such a system and method on a microprocessor-based platform.

In the accomplishment of these and other objects, the present microprocessor-based system and method stores and forwards audio/video signals on demand. Such system and method includes an encoder for receiving, digitizing, and compressing audio/video signals into a data stream, and a first processing system for further compressing (stripping off network overhead from the data stream) and storing the data stream received from the encoder, and for later transmitting the twice-compressed data stream via a transmitting system to a location remote from the first processing system. A second processing system receives, processes, and stores the data stream from the remote first processing system, and later transmits a copy of the data stream, upon receipt of a request for replay of the audio/video signal after retrieving and decompressing the copy of the data stream. Such system and method also includes a decoder for further decompressing and transforming the data stream into an analog signal for transmission to at least one television set for replay.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 6a and 6b are schematic drawings of fixed and variable length records, respectively.

DETAILED DESCRIPTION OF PREFERRED EMBODIMENTS

It should be noted from the outset that, in addition to watching video programs, listening to a variety of strictly audio presentations is quite popular. Such presentations include, for example, concerts, dissertations, sports, as well as education and training programs, which can be played through standard television speakers. While the discussion hereinafter will address store-and-forward systems and methods in connection with video programs, it should be understood that the present invention can be equally applied to any analog source of information, including strictly audio presentations. Moreover, additional applications of the present invention are addressed later in this discussion.

Figure 1:
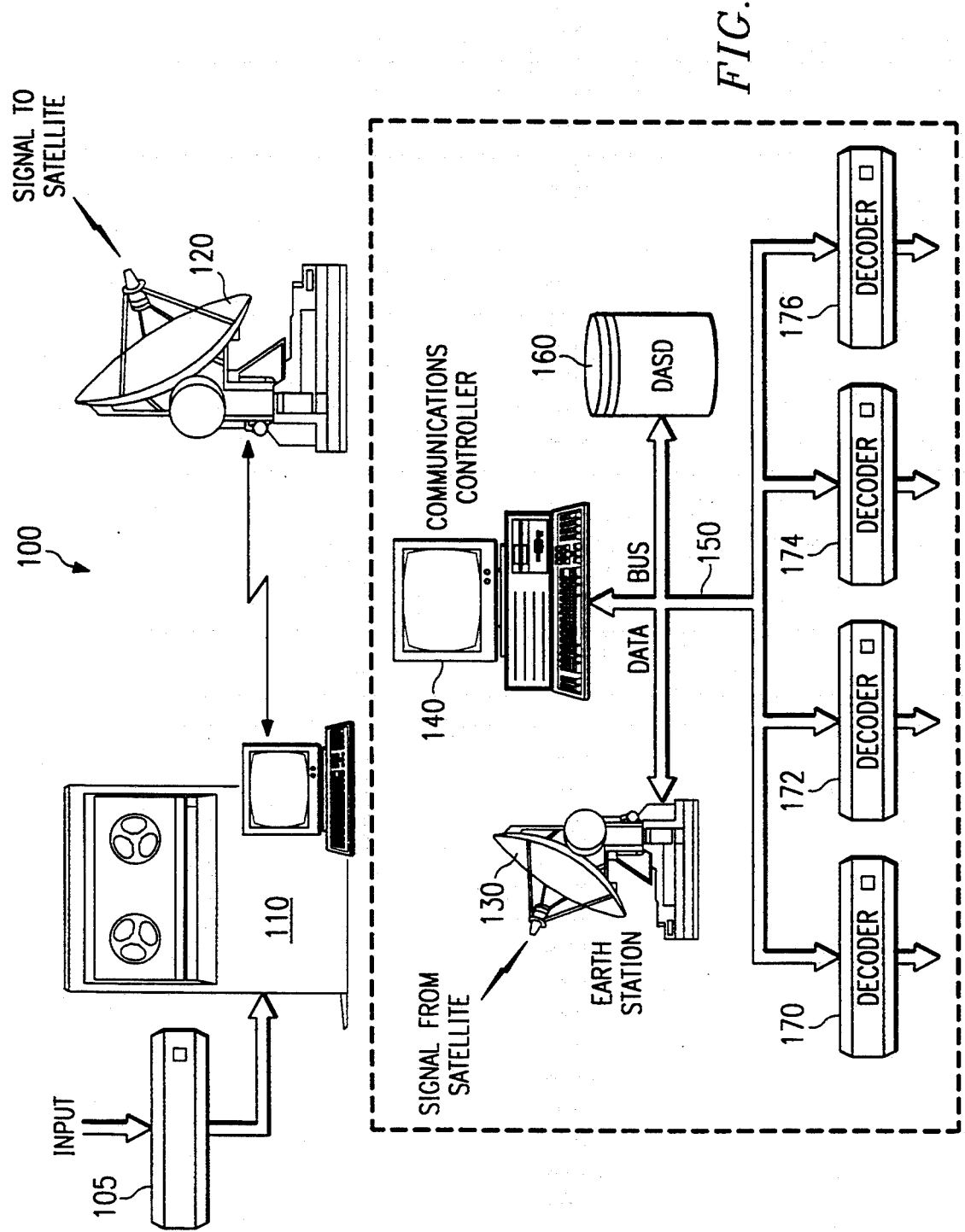
FIG. 1 is a schematic drawing of an example store-and-forward system employing the present invention.

The present system and method provides reliable, simultaneous video replays delivered by a microprocessor-based host system designed to play movies from archival storage. FIG. 1 depicts an example configuration of such a store-and-forward processing system 100 according to the present invention.

The input to store-and-forward system 100 can be generated by any number of devices (not shown) such as a laser disc, camera, VCR, any standard television input, or any analog audio/video source which yields audio/video source material. Such material might contain, for example, a music concert or video, a film, a TV program, a multi-media production, informational commercial, a conference video with associated program audio, as well as audio only or video only programming. Numerous additional examples will occur to those skilled in the art.

The audio/video source material input is fed into encoder 105. Although the preferred encoder is the SpectrumSaver compressed digital video (CDV) encoder (a trademark and product of Compression Labs Incorporated), it will be appreciated that other encoders will operate within the spirit of the present invention. Encoder 105 digitizes and compresses the audio/video source material into a serial bit data stream which is then fed to workstation 110.

Workstation 110 is preferably at least a 486 50 Mhz class personal computer. For the sake of discussion herein, system 100 incorporates at least one workstation or client/server 110. It should be understood that workstation 110 could also be a mainframe computer or any other processing system capable of the throughput necessary for uninterrupted transmission. The exact composition of such workstation or mainframe 110 are well-known and will not be described herein.

Before it is recorded (stored) on magnetic disk, workstation 110 further compresses the digital data stream for more efficient storage. This is preferably accomplished by stripping off all unneeded data, such as network overhead which might include forward error correction and addressing information, (process described in more detail later). The audio/video source material encoded in the serial bit stream is then preferably recorded on a magnetic (hard) disc subsystem within workstation 110, although it could be stored on any appropriate magnetic media.

The data stream is delivered by workstation 110 at a predetermined later time to uplink 120 for transmission of the digital video SCPC (single carrier per channel) signal to a satellite (not shown). The satellite in turn transmits the digital video SCPC signal to digital receive only earth station 130. The transmission from workstation 110 to communications controller 140 does not have to be by satellite; it could be by cable, normal telephony circuits, microwave, fiber, cellular, etc. The present system preferably employs satellite however, because it is a cost effective way to transmit to a number of remote subscribers simultaneously.

Once the data stream is received by receive only earth station 130, it is fed via a data link 150 to a video workstation, where it is captured and stored in its compressed form in direct access storage device (DASD) 160. This workstation comprises communications controller 140, data bus 150 and DASD 160, as well as associated software (not shown). It should be understood that though DASD is disc in a current implementation of the present invention, it could also be any type of random access device, for example, DRAM, bubble memory, optical disc, or any type of mass data storage with enough capacity, (e.g., typically 2 gigabytes per two hour program/movie).

It should be observed at this point that workstation 110 and communications controller 140, data bus 150 and DASD 160 could be the same workstation. Specifically each workstation, according to the present invention, is capable of receiving input from encoders and transmitting to other workstations, as well as receiving input from other workstations and transmitting to decoders—all with as little as a change in one bit to reflect which configuration the workstation is to take.

Data bus 150 represents the data bus of the workstation itself where the peripheral cards plug in (parallel data bus), as well as the data bus that connects digital storage 160 with the workstation. The interface to digital storage 160 in the present system is preferably a fast and wide SCSI-2 (small computer systems interface), although other interfaces could be employed.

From an external source via a control input port, communications controller 140 receives a serial command to play a selected program from those stored in DASD 160. An user or another computer or another program running on controller 140 can direct communications controller 140's actions via commands provided through a serial port to communications controller 140. Such commands, in addition to "play" include, for example: step forward, step backward, pause/freeze frame, stop, advance frame by frame, and play on a specific port. Step forward and step backwards means "step-in-time" either forward or backwards because the data stream is in the digital, and not analog, domain.

Specifically, when a program is requested, a control program residing on communications controller 140 reads the appropriate data file(s) containing the desired program from DASD 160, restructures (reorders) and then decompresses (rebuilds) the data stream. The data stream is restructured because it is not necessarily laid down in the same contiguous serial blocks on disc drive 160 that it came in off the port. The present system then selects an available communications serial port and begins to feed the selected data file(s) through that serial port to compressed digital video decoding device(s) 170,172,174,176.

While the present system preferably employs at least one SpectrumSaver series M6 decoder, it should be apparent to those skilled in the art that other decoders could also be employed. Decoders 170,172,174,176 perform audio/video decompression and then convert the digital data stream to an analog data stream before feeding the data stream to an analog NTSC video and audio cable head-end (not shown) for transmission to at least one television set (also not shown). It should be understood that decoders 170,172,174,176 could instead feed the analog data stream to anything that accepts and plays standard television signals, including for example, directly to a TV, directly to a cable TV distribution, to a VCR, or to a fiber optic link.

The present system is designed to be scalable, preferably employing from 1–32 decoders and then in multiples of 32 decoders, depending upon the size of a subscriber (e.g., a large hotel, a hospital, an apartment complex, or even a small city); the present invention can cost effectively handle thousands of decoders per overall system; subsystems therewithin would handle approximately 32 decoders each. Of course, for the city scenario, while the present system would require more software to manage the increased number of decoders and a more powerful machine, essentially the system configuration and method of operation would not change.

Figure 2A:
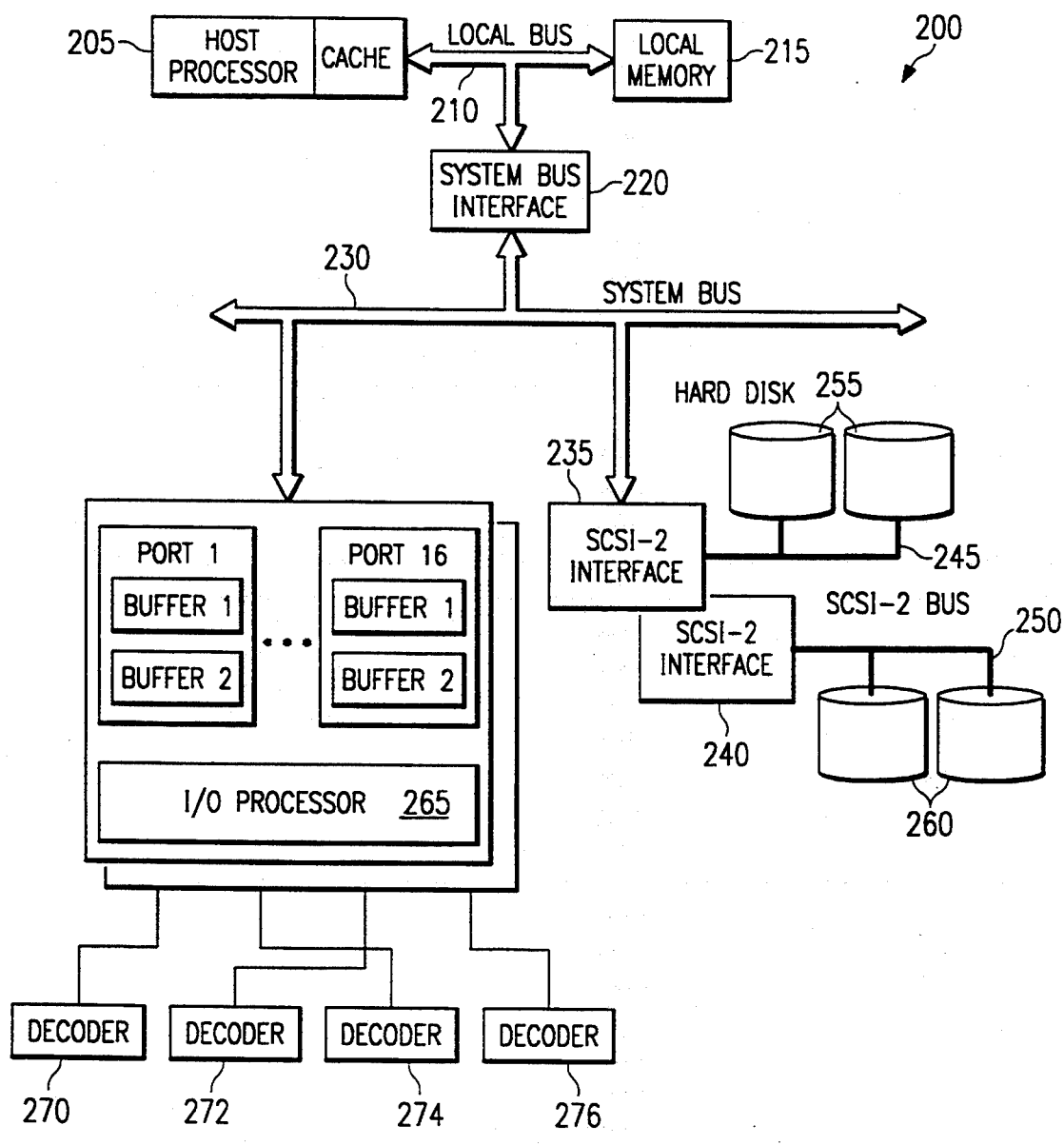
FIGS. 2a and 2b are schematic illustrations of example microprocessor-based store-and-forward systems employing the present invention.

Consider now FIG. 2a, which illustrates a more detailed schematic example of a microprocessor-based store-and-forward system 200 for video replay according to the present invention. With no more than a change in a bit (described later) and exchanging decoders 270,272,274,276 for encoder(s) 105, FIG. 2a also illustrates an example workstation 110 plus encoder(s) 105. One is reminded that workstation 110, and communications controller 140, data bus 150 and DASD 160 could all be the same machine.

System 200 consists of microprocessor system 205,210,215,220 and host bus 230, together with hard disk storage 235,240,245,250, 255,260, and high speed communications controllers/processors 265. System bus 230 could be either an ISA, EISA or MCA bus. Moreover, a SCSI-2 interface is preferred for SCSI hard drives 255,260 because it permits a number of drives to be mounted on a single system.

System 200 stores programs encoded in compressed digital form, on local hard disc 255,260. When the control program receives an external (external to the control program) request to play a selected program, the program is played by passing digital data streams through high speed communications ports to compressed digital video decoders 270,272,274,276 which in turn generate composite video signals for transmission to a designated set of televisions.

An example of I/O processor 265 for system 200 could be a HSSI (high speed serial communications interface), although other processor interfaces could be employed. I/O processor 265 preferably has 16 I/O ports tied to one interface 235. If there are two SCSI interfaces 235,240, then there is a second I/O processor 265. I/O processors 265 work in parallel, asynchronously of each other. With a second I/O processor 265, up to 32 decoders may be supported—16 per I/O processor 265.

All video data transfers are handled by SCSI interfaces 235,240. I/O processors 265 on the communications interfaces are responsible for providing data to compressed digital video decoders 270,272,274,276 at the required rate. Resource allocation and buffer management for processors 265 is done under host CPU supervision by the control program. Data transferred between boards or the CPU is preferably in the raw format stored on the SCSI system.

Compressed digital video decoders 270,272,274,276 are connected, via high speed buffered communications ports and system bus 230, to host microprocessor system 205,210,215,220. Each decoder is associated by system software with a video track or data stream to be replayed. In a preferred embodiment, all ports interfaced to decoders are allocated at least two memory buffers to keep video replay consistent and uninterrupted. The requirement for uninterrupted movie replay is a sustained data rate of 1.8 Mbps or 225 KBps from hard disk 255,260 through the ports to the compressed digital video decoders 270,272,274,276. Additionally, each memory buffer can be as large as desired, depending on the amount of dual ported RAM available on the communications interface.

FIG. 2a reflects one embodiment of the present invention—namely replay of a desired program from disk drive 255,260 over system bus 230 through the buffered ports of I/O processors 265 to decoders 270,272,274,276.

Replay Through System Bus

One aspect of the present system is the use of a memory mapped communications interface. This type of interface eliminates transfer of video data from hard disk 255,260 to local memory 215 and then to the communications I/O processor 265 via system bus 230. Memory mapping allows video data to be transferred from hard disk 255,260 directly to communications port buffer memories via system bus 230.

I/O communications processors 265 pull data from port buffers and pass it out through the ports to decoders 270,272,274,276 under control of the control program residing on host computer 205,210,215. The control program ensures each port's data buffers are not allowed to become completely empty or overfull. To do this, SCSI disk devices are preferably used to transfer video data directly to memory mapped I/O port buffers, all under host control. Thus, as each buffer is emptied, I/O processor(s) 265 is directed to the next full buffer for the compressed digital video decoder's port.

However, memory mapped communications devices introduce wait states in the system bus memory cycle when onboard I/O processor 265 and another bus master 235,240 (e.g., SCSI) are simultaneously accessing dual ported memory. These conditions reduce the bus transfer rates to 4.57 MBps (1.5 waits) for ISA/EISA and to 6.66 MBps (1 wait) for MCA. SCSI-2 interface 235,240 supports transfer rates of 5–10 MBps for an ISA bus and 10+ Mbps for an MCA bus, both of which are greater than the communications-imposed limits previously stated.

Additionally, in a preferred embodiment, host processor 205 contains a large cache memory. This increases the host CPU's cache memory hit rate when running video scheduling algorithms according to the present invention. Thus, contention between host CPU 205 and SCSI bus mastering devices 235,240 for system bus 230 is reduced, leaving more bus cycles available for data transfer operations.

The throughput of the present system, in terms of number of playable programs, such as for example movies, is considered in connection with two different embodiments of the present invention discussed below. For the sake of such discussion, the stated data rate required to play a single movie through a decoder is 225 KB per second; sustained data transfer at this rate provides uninterrupted replay. Moreover, the maximum seek time for a Maxtor MXT-1240S SCSI disk drive is 20 msec, minimum seek is 15 msec, maximum latency is 9.5 msec and minimum data transfer is 2.8 MBps. It should be understood that other SCSI disk drives could also be employed in the present invention.

ASYNCHRONOUS "ON DEMAND" REPLAY. The requirement for on demand replay for programs such as, for example, movies means that, at any time, a customer may request replay of an entire on-line movie without joining a movie already in progress, unless of course, the customer wants to join the movie in progress. Movies are started subject to customer request and do not run on a predefined schedule. One decoder is assigned to each request.

Using two 32 KB buffers for each port and a single disk drive 235 with at least one movie on it, yields:

1. A 32 KB transfer time of 11.5 msec. (32 KB/2.8 Mbps)

2. Seek to next customer's track and position for next read is 20 msec (worst case seek) plus 9.5 msec (worst case rotational latency) resulting in 29.5 msec.
3. Total read time for 32 KB=41 msec.

The effective throughput of 1000/41*32 KB=780 KB/sec is greater than the 225 KB/sec required per movie. Therefore, a total of 780/225=3 customers/movies can be reliably serviced from the disk.

If larger buffers are set aside, the number of customers/movies can be increased accordingly. Given two 512 KB buffers of onboard memory per port yields:

1. A 32 KB transfer time of 11.5 msec.
2. Seek to next track and position for next 32 KB read is worst case of minimum seek (1.5 msec) or maximum rotational latency (9.5 msec): 9.5 msec.
3. 512 KB buffer fill using 32 KB reads on adjacent tracks is a total of 16*11.5 msec+15*9.5 msec=326.5 msec.
4. Seek to next customer's track and position for next read is 29.5 msec.
5. Total read time for 512 KB=356 msec.

This time the effective throughput of 1000/356*512 KB=1438 KB/sec. Thus a total of 1438/225=6 customers/movies are reliably serviced from the disk.

Finally consider SCSI disk drives 255,260 configured in a RAID 0 type disk array with synchronized spindles. A RAID (redundant array of independent disks) 0 configuration is preferred because data redundancy, which slows RAID speed, is not necessary for this application. Off-line movie storage is preferably accomplished with WORM optical devices where movies are reloaded if failure occurs. Given RAID 0 with 4 parallel drives, the data transfer rate increases to 11.2 ps. Since this is greater than the sustainable ISA or MCA system bus transfer rates to the communications buffers, the buffer rate of 4.57 ps for ISA is the limiting factor. Thus:

1. 32 KB transfer time of 32 KB/4.57 ps=7 msec.
2. Seek to next track and position for next 32 KB read is 9.5 msec.
3. 512 KB buffer fill using 32 KB reads on adjacent tracks is a total of 16*7 msec+15*9.5 msec=244.5 msec.
4. Seek to next customers track and position for next read is 29.5 msec.
5. Total read time for 512 KB=274 msec.

The effective throughput of 1000/274*512 KB=1868 KB/sec. This results in a total of 1868/225=8 asynchronous customers/movies reliably serviced from the disk.

Note that only 14% of available bus bandwidth is being used even with a RAID array. This is primarily due to seek and rotational latency times. Clearly, the above disk-imposed limits are not acceptable for servicing a large number of customers. One obtains significantly better performance, however, by qualifying the term "on demand" to allow for synchronized replay of movies.

SYNCHRONOUS "ON DEMAND" REPLAY.

The basic idea of synchronized replay is to divide a program such as a movie into video segments each of which play simultaneously. For example, movies could be divided into ten minute video segments, which result in 12 video segments for a two hour movie. The host system throughput must be great enough to allow all segments to play simultaneously. Thus, for a two hour movie divided into ten minute segments, the host processor supports a sustained throughput rate of 12*1.8 ps/8 bits or 2.7 ps.

If movies are divided into ten minute video segments and given that at least 1.2 GB drives are used, two drives are required to hold each movie. Six video segments for the first hour of the movie would be on drive 1, with up to six segments for the second hour on drive 2.

With this configuration, there are several methods of mapping video segments onto the drives to support synchronized replay. The simplest approach is to place the segments front to back on each drive, just as they would be in the asynchronous case.

As indicated earlier, a compressed digital video decoder connected via a high speed buffered communications port 265 is associated with each video segment being viewed. In a synchronous configuration, the video segment playing control program would fill empty buffers for the current segment before stepping to the next segment and filling those buffers. When a customer's current segment has completed play, his compressed digital video decoder is associated, by the control program, with the next segment scheduled for play. This continues until the complete program has been played. The decoder is then freed for reassignment to a new customer/movie.

Using two 512 KB buffers on the communications board for each port and dual disk drives for each movie, yields an effective throughput of 1000/356*512 KB=1438 KB/sec per disk or 2876 KB/sec for a movie split across 2 disks. Thus a total of 2876/225=12 synchronous video segments for the given movie can be serviced reliably from the disks. This means that the movie can indeed be shown at ten minute intervals. Therefore, a single MCA system could support 2 movies, each with 12 starting times while an ISA system could support 2 movies if each had 10 or fewer starting times or if the combined number of simultaneous video segment replays was 20 or less. Clearly, there is a tradeoff between number of starting times and total movies supported on a single system.

By splitting the movie across two drives, seek and rotational latency times can be overlapped for each drive playing the same movie. Thus the movie replays at ten minute intervals more easily from two drives than from a single large drive. A single drive does not allow overlapped seeks and requires a larger video segment size and thus, a longer replay interval. If more frequent starting times are required, because of the popularity of a movie for example, a movie could be recorded over a greater number of smaller drives.

An additional advantage of synchronized replay is that it is not necessary to have one decoder for each customer (as required by asynchronous replay). The number of decoders and communications ports needed is equal to the minimum of: 1) the number of movies to be offered multiplied by the number of video segments per movie or 2) the number of customers to be serviced.

Figure 2B:
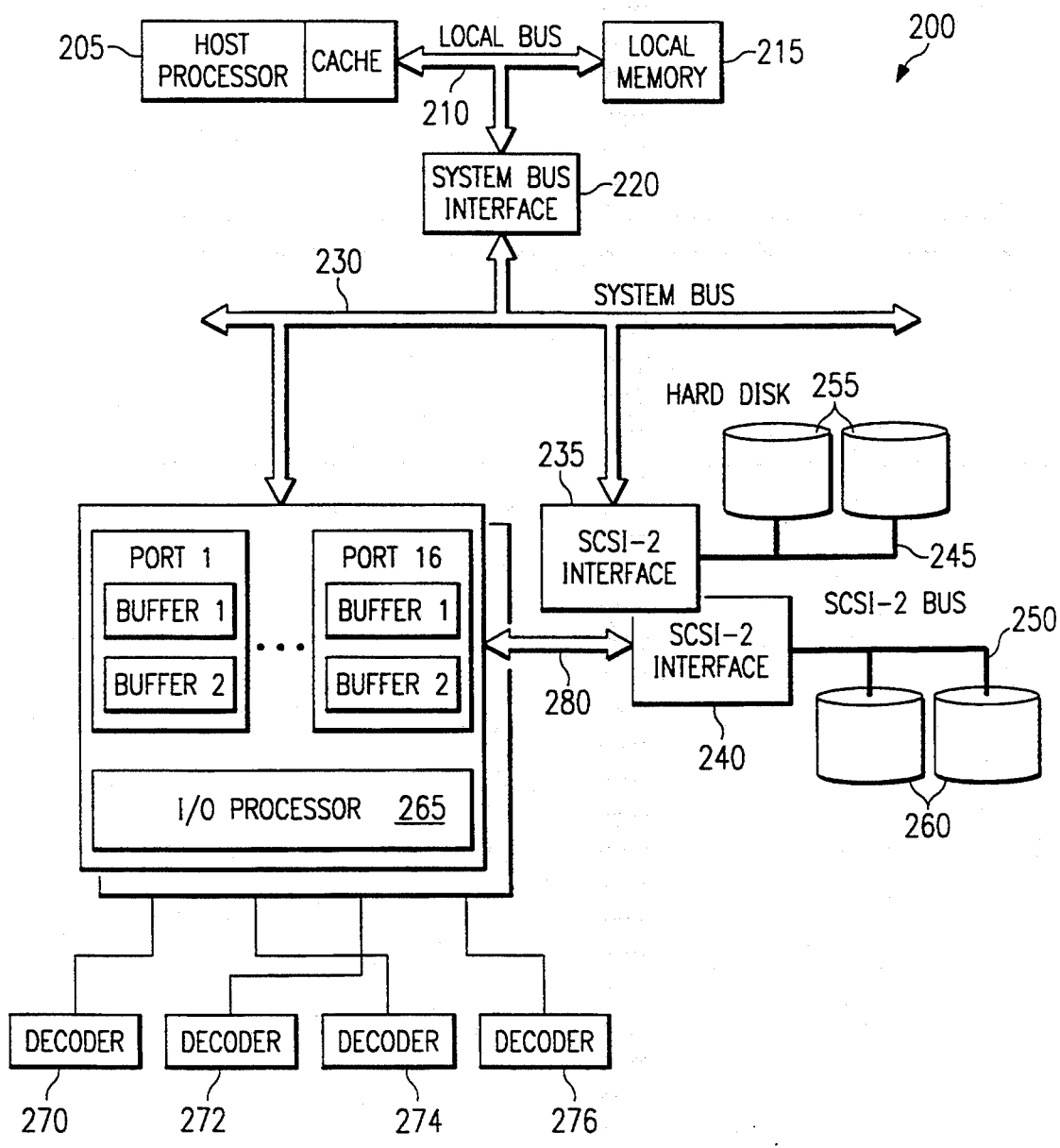

Nevertheless, higher data transfer rates can be obtained without losing reliability. FIG. 2b reflects another embodiment of the present invention—namely replay of a desired program from disk drive 255,260 directly to buffered ports of I/O processors 265 to decoders 270,272,274,276 without traveling system bus 230.

Replay Directly to I/O Processor

As is apparent from viewing FIGS. 2a and 2b, the configuration of FIG. 2b essentially has not changed much from that of FIG. 2a, except in one important respect—the data stream for the replay does not traverse the system bus. Thus, the discussion above with respect to the unchanged aspects of FIG. 2b are incorporated herein and will not be repeated.

The above performance limitations, which are primarily due to limited bandwidth of the system buses, are significantly improved with the insertion of a communications controller circuit board with related software 280 so that the data stream is no longer transferred from discs 255,260 via system bus 230. Thus, input/output processor 265 talks directly to SCSI-2 interface(s) 235,240 via communications board 280 to avoid bogging down the system. Specifically, the data stream flows from disc storage 255,260 across SCSI-2 bus 245,250 through SCSI interface(s) 235,240 directly to I/O processor; it does not traverse system bus 230. Of course, system bus 230 does connect with SCSI-2 interface 235,240, as well as the channels of I/O processor 265, to allow the control program aboard microprocessor system 205,210,215,220 to communication with same. Moreover, because the data stream is no longer transferred to the buffer memories via the system bus, the overall data transfer rate is limited only by the SCSI-2 interface transfer rate of 10+ Mbps.

It should be apparent that by no longer transferring the data stream through the system bus, the host system also no longer needs a large cache memory. By the addition of the controller board, the speed, efficiency, and cost effectiveness of the present system greatly increases, while the amount of software required to operate the present system decreases.

As a result, given two 512 KB buffers of onboard memory per port for an asynchronous system yields:
1. A 32 KB transfer time of 3.2 msec. (32 KB/10 MBps)
2. Seek to next track and position for next 32 KB read is worst case of minimum seek (1.5 msec) or maximum rotational latency (9.5 msec): 9.5 msec.
3. 512 KB buffer fill using 32 KB reads on adjacent tracks is a total of 16*3.2 msec+15*9.5 msec=193.7 msec.
4. Seek to next customer's track and position for next read is 29.5 msec.
5. Total read time for 512 KB=223.2 msec.

This time the effective throughput of 1000/223*512 KB=2294 KB/sec per disk or 4588 KB/sec for a movie split across two disks. Thus a total of 2294/225=10 asynchronous customers/movies are reliably serviced from the disk, while 4588/225=20 synchronous video segments are reliably served from two disks. In light of the above discussion, multiple data files which are stored/accessible through SCSI interface 235,240 are preferably spread across more than one disc (for synchronous replay).

Communication circuit board 280 is an electronic circuit card assembly that operates under a standard PC microprocessor platform. It performs data communications over a modified synchronous RS-422 channel and is managed by the control program via system bus 230. Communications circuit board 280 receives digital data serially as input and stores the data on SCSI hard drive subsystem 255,260. It also outputs the stored data across up to sixteen (16) different channels simultaneously. Moreover, board 280 preferably employs a general purpose SCSI utility for formatting drives and bad block management. Specifically, bad block management (on a disc 255,260) is maintained without loss of performance and is handled by the hard drive. Once a bad block has been remapped it becomes transparent to the board.

Communications board 280 preferably consists of at least the following components: 1 input channel at up to 6.6 Mbits/sec (for connection to the IRD, or encoder as the case may be), 16-32 output channels at up to 6.6 Mbits/sec (for connection to the decoders), 1 input/output channel to system bus at 1 Mbit/sec (for file transfer between multiple boards), 1 or 2 SCSI-2 bus interface(s) (for connection to the hard disk subsystem(s)) capable of maintaining throughput of all channels simultaneously, without losing data or starving a channel, input/output circuitry and a data queue controller. Each circuit board preferably has at least 16 unique configurable addresses (such as register addresses mapped into extended memory—above 1 MB), enabling multiple cards to exist on the same system bus and interact with the control program.

Figure 3:
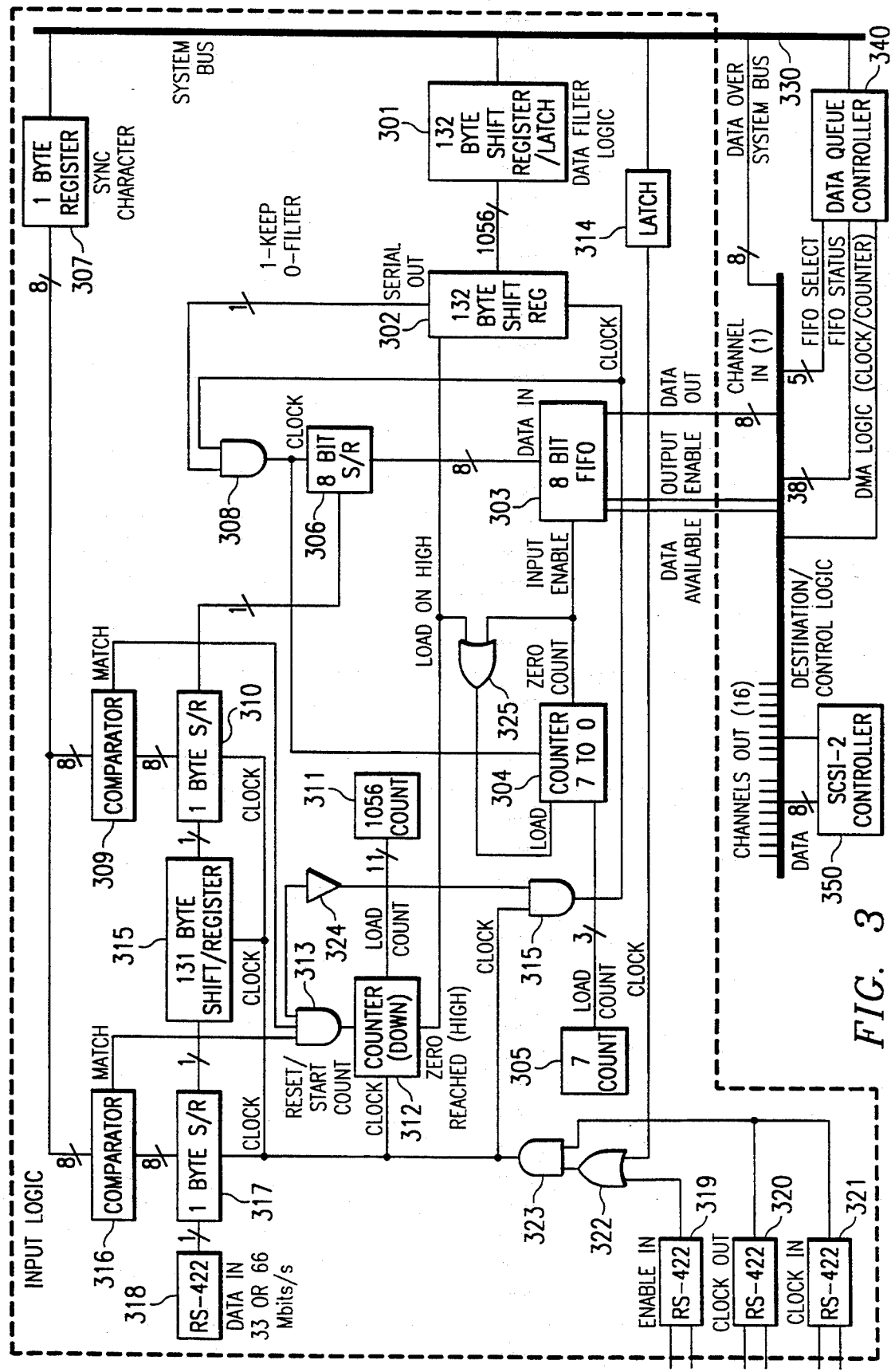
FIG. 3 is a schematic input channel circuit diagram according an embodiment of the present invention.
Figure 4:
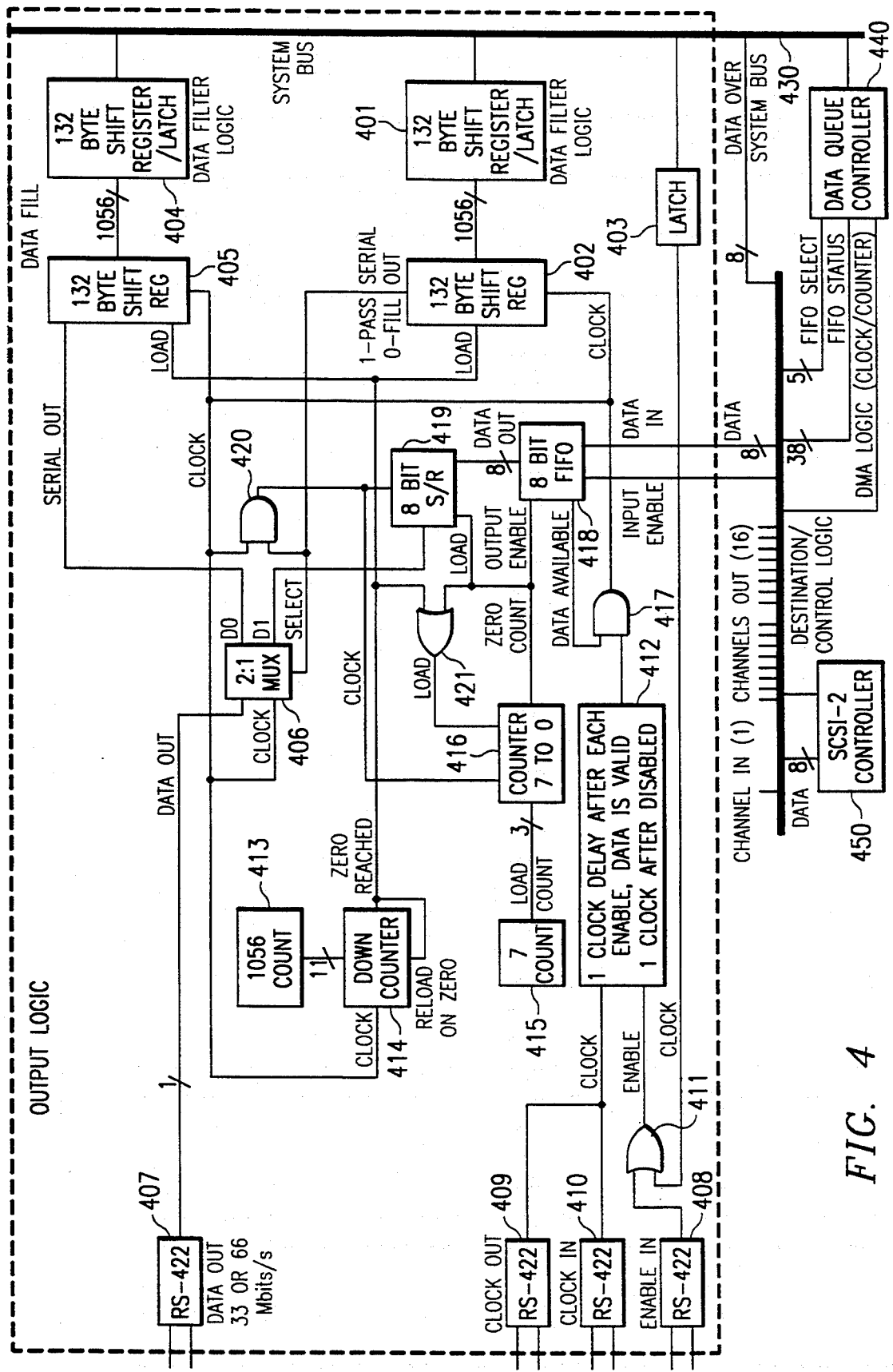
FIG. 4 is a schematic output channel circuit diagram according to an embodiment of the present invention.

Board 280 comprises both input channel logic (FIG. 3) and output channel logic (FIG. 4). However, before considering the operation and details of communications board 280, one should consider the following data flow. Communications board 280, when acting as an input circuit, has two hardware bits: one bit turns it on and the other tells it whether to process Format A records or Format B records. Format A records are those coming in from an encoder, requiring additional compression, according to the present invention, before being stored. Format B records are those coming in from another workstation, requiring only storage of the records. Communications board 280 acting as an input circuit then provides true data under Format A and under Format B it provides the record number and checksum valid bit.

Specifically, as an input circuit, communications board 280 receives (Data In "A") fixed length (preferably 132 byte) records without either a checksum or record count. (See, for example, FIG. 6a). The control program tells the input port when to start and provides board 280 with such information as file size in records, the mask to strip off data, such as network overhead which might include forward error correction and addressing information, prior to storage to disc, and the storage scheme and location of the file on the SCSI system. As depicted in FIG. 6a, data flows from left to right. "SYNC" is a synchronization character 8 bits long. Although A-G represent various blocks of data, which can be a single bit or a series of bits up to the maximum length of a record, in this example, only data items B & C were retained. Thus, while the data items to be saved could be any part of the record, the same data items will be consistently saved for all records in the file.

When communications board 280 is handling Format B data as input, it receives (Data In "B") a record. These records are later sent at Data Out "A". (See, for example, FIG. 6b). This record contains a SYNC character, data, record count, and checksum. Moreover, the control program provides the board with the file length, the destination and storage scheme for the SCSI, the record size, and the mask. The B & C data items are part of the data from the original transmission record (Data In "A").

Consider now FIG. 3 which is a schematic circuit diagram depicting the preferred input channel logic for communications board 280. One of the functions of the input channel circuit is to strip off unneeded bits in the 132 byte input records. This is accomplished using shift registers. A bit mask (132 bytes wide) provided by the control program tells the communications circuit board 280 which bits in the record to keep and which bits to drop. This process is done during encoding of the programs or movies to conserve disk space. While the input logic seen in FIG. 3 reflects the communications board's ability to handle Format A or Format B data, the former will be used to demonstrate the operation details of communication board 280 as an input circuit.

Specifically, the encoder clock line is connected to RS422 input line receiver 321 (clock in), while the data line from the encoder is connected to RS422 input line receiver 318 (data in). The control program tells data queue controller 340 (via system bus 330) to reset the circuit board, move data from RS422 input line receiver 318 to a file, and to expect a file of N bytes.

8-bit parallel latch 307 is loaded by the control program over system bus 330 with a sync character (for example, assume a default of '11001100'). This pattern is latched out to 8-bit comparator 316 and 8-bit comparator 309. Meanwhile, 132-byte parallel latch 301 is loaded by the control program via system bus 330 with the bit strip mask. A bit strip mask tells the communications circuit which bits in the record to keep and which bits to drop in order to conserve disk space. A '1' is loaded into 1-bit latch 314 by the control program via system bus 330. Since latch 314 is high, input line receiver (enable in) 319 is ignored because it is used only for the "Data In B" format. At this point, 2-input OR gate 322 is then high and the 2-input AND gate 323 output is a mirror of the clock from input line receiver 321.

The digital data stream that comes into input line receiver 318 continues to serially shift into 8-bit shift register 317. The output of AND gate 323 (clock signal) drives shift register 317. After each bit is shifted, the 8-bit pattern in shift register 317 is sent in parallel to 8-bit comparator 316.

If the 8-bit input from shift register 317 and 8-bit parallel latch 307 are the same, then a '1' is sent out from comparator 316 to 3-input AND gate 313. If the 8-bit input from 8-bit shift register 310 and parallel latch 307 match, then a '1' is sent out from comparator 309 to AND gate 313. If both comparators 316 and 309 match at the same time, AND gate 313 receives a third '1' thereby causing 11-bit down counter 312 to output a '1'.

Three '1's input to AND gate 313 makes its output a '1', thereby signalling counter 312 to load in parallel 11-bit latch 311's 1056 bit value (1056 bits=132 bytes). Counter 312 then begins to count down from 1056 to 0. Each clock from AND gate 323 decrements counter 312 until 0 is reached. At the time of loading from latch 311 to counter 312, counter 312 has not reached 0, making the output of AND gate 313 low, and preventing the loading of the contents of latch 311. When counter 312 reaches 0, the bit mask pattern from parallel latch 301 is loaded into 132-byte shift register 302. The clock signal coming from AND gate 323 moves this bit mask pattern serially out of shift register 302 to 2-input AND gate 308.

When shift register 302 is loaded from the signal out of counter 312, 3bit down counter 304 is loaded with a 7 (largest 3-bit value) from 3bit parallel latch 305. Counter 304 counts down 8 times (from 7 to 0). Upon reaching 0, counter 304 sends a '1' to 8-bit wide FIFO memory 303 telling it to load the byte pattern from 8-bit shift register 306.

The pattern being shifted out of shift register 310 is the beginning of a 132-byte record starting with the sync byte going to shift register 306. Shift register 306 contains 8-bits of the mask from shift register 302. Shift register 310's clock comes from AND gate 323. As the data shifts serially into shift register 306, the parallel pattern goes out into FIFO memory 303. Since the clock for shift register 306 is the mask in shift register 302 ANDed (through AND gate 308) with the clock from AND gate 323, an edge change can only occur when a bit is valid. The valid bit is then clocked into shift register 306, while counter 304 decrements.

The inverter 324, 131-byte shift register 315 combination inhibits the clock to shift register 302, which prevents any garbage data from being loaded into FIFO memory 303 once the circuit is activated, but before valid data comes in. As data through shift register 317 shifts into shift registers 315 and 310, it is compared on the end (shift registers 317 and 310) for a sync character (shift registers 310 plus 315 equals one record). If a match in shift registers 317 and 310 occurs, counter 312 loops back to AND gate 313 to prevent random data within a record from triggering a pattern match. If a match between shift registers 317 and 310 occurs, the data (garbage) continues to shift out of shift register 310 and be discarded since shift register 306 is not getting a clock.

The data queue controller polls FIFO memory 303 to see if it is close to being full ($\frac{7}{8}$ or other ratio depending on FIFO thresholds). The data queue controller tells the SCSI controller the destination address and the amount of data. At that point, most or all of the data (depends on FIFO thresholds) is moved out of FIFO memory 303 onto the data queue controller's bus to the SCSI disk destination. This movement of data is accomplished using the clock and enable lines generated by the data queue controller.

Communications board 280, when acting as an output circuit, also has the same two hardware bits: one bit turns it on and the other tells it whether to process Format A records or Format B records. This time, however, Format A records are those going out to another board (workstation) requiring only retrieval from storage. Format B records are those going out to the decoder(s) requiring decompression (rebuilding), according to the present invention, before being transmitted. Communications board 280 acting as an output circuit consumes true data and converts it to either Format A or Format B. Under Format A, the output circuit reads the mask bits from local RAM and generates the output data with filler bits and a sync byte which gets loaded into the appropriate output channel. Under Format B, the output circuit consumes true data and generates the record with a sync byte and a checksum. This data is then loaded into the output channel as final data bound for the decoders.

Specifically, the control program tells communications board 280, as an output circuit with Format A data, which output port (Data Out "A") to send the file containing records (See, for example, FIG. 6b. Error=error check which can be a bit summation or byte checksum. Error recovery is done by replacing bad records when the file is transmitted a second time. Moreover COUNT=record count in sequential order (1, . . . n).) The control program provides the board with the record length, the mask for fill bits (if any), what those fill bits are defined as (if applicable), the file length, and the file storage scheme on the SCSI subsystem. The communications board appends a record count and checksum to each record sent out.

If the communications board rejects a record due to checksum or misses a record count (they are sequential), then the board fills in the missing data within the file on the SCSI disc. The number of bits per record to be written to disc is preferably divisible by 8. This prevents data gaps and out of sync records. Specifically, when the data queue controller gets an interrupt from the input circuit indicating a record has arrived, then it checks a bit provided by the input circuit that indicates whether the record passed the checksum validation. If the record did not pass the checksum validation, then the record is discarded. If the If the record passes the checksum, then the record number is compared to the expected record and if it is out of sync then all of the records between the expected record and the one that actually arrived are assumed to be lost. This allows for the loss of large amounts of data in consecutive order.

Each data file is transmitted twice. During the first transmission, the board saves the bad record numbers to a list and associates the list with the transmitted file. The second transmission of the file is used to recover as many of the bad and/or missing records lost during the first transmission as possible. During the second transmission, the board ignores records properly transferred during the first transmission of the file. When a record that was bad during the first transmission is properly received in the second transmission, the board updates the file on the SCSI drive with the replacement records, as well as the bad record list associated with that file. After the second transmission, the control program determines whether the file on disc is complete and error-free based on the bad record list associated with the particular file.

The control program tells communications board 280, when it is handling Format B data as output, to transmit a file through an output port (Data Out) in a fixed length record. (See, for example, FIG. 6a). Moreover, the control program provides the board with the file length, the file storage scheme for the SCSI, the mask for the data within the fixed length record, the fill bits setting for this record, and no record count or checksum. This record is the same as the original record shown in Data In "A", except for only portions (B & C) have made it this far. This is what is provided to the decoders to decompress and transform back to an analog state.

Consider now FIG. 4 which is a schematic circuit diagram depicting the preferred output channel logic for communications board 280. One of the functions of the output channel circuit is to restore the previously stripped off bits to the 132 byte output records. This is accomplished using shift registers. A bit mask (132 bytes wide) provided by the control program tells the circuit where to insert filler bits and where to insert data bits in the record. This process is done during decoding of the movies since the decoders require the same data stream format as that produced by the encoder, but value of these filler bits does not matter to the decoder. While the output logic seen in FIG. 4 reflects the communications board's ability to handle Format A or Format B data, the latter will be used this time to demonstrate the operation details of communication board 280 as an output circuit.

Specifically, the decoder clock line is connected to input line receiver 410 (clock in). The data line from the decoder is connected to data line transmitter 407 (data out). The control program tells data queue controller 440 (via system bus 430) to reset the circuit board, and to send a file of N bytes to specific output channel. When the data queue controller polls this channel, the data queue controller 440 determines whether 8-bit wide FIFO memory 418 is almost empty. If so, the next block of data from the file is requested from the SCSI controller. The block of data will not overfill FIFO memory 418. When FIFO memory 418 receives this data, the data available line of FIFO memory 418 goes high and is fed into 2-input AND gate 417.

AND gate 417 receives the external clock from the decoder through input line receiver 410. Clock delay circuit 412 is designed for use by the "Data Out A" format data, and will not affect the outcome of the "Data Out B" format data. A '1' is loaded into 1-bit latch 403 by the control program via system bus 430, since input receiver 408 (enable in) is only used for the "Data Out A" format.

132-byte parallel latches 401 and 404 are both loaded by the control program over the system bus. Parallel latch 401 contains the bit strip mask. In this situation, the bit strip mask tells the circuit which bits in the record are real data and which bits are to be filled in to restore the original unstripped record format. As it turns out, the decoder does not care what values the filler bits have. Parallel latch 401 indicates where to insert filler bits, and parallel latch 404 tells the value of each of these bits—'1' or '0'. 132-byte shift registers 402 and 405 are loaded with data from parallel latches 401 and 404, respectively.

When 8-bit wide FIFO 418 has data available, the clock signal (which is the output of AND gate 417) is allowed to pass through to shift registers 402 and 405. The load lines of shift registers 402 and 405 then activate 11-bit down counter 414. When counter 414 is initialized to 0, shift registers 402 and 405 are loaded with the contents of parallel latches 401 and 404, respectively. Counter 414 is loaded from 11-bit latch 413, which contains the record size in bits (1056). Counter 414 counts down with each clock pulse out of AND gate 417.

The clock signal out of AND gate 417 also is an input to 2-input AND gate 420. The other input to AND gate 420 is the bit mask being serially shifted out of shift register 402. This serial data stream from shift register 402 also drives the 2:1 MUX 406 select line. If the bit from shift register 402 is a '1' and the clock signal out of AND gate 417 is high, the output of AND gate 420 drives 8-bit shift register 419 to serially shift a bit out., which bit goes into D1 of MUX 406. Since the bit from shift register 402 is '1', the select line of MUX 406 selects D1 to be the data out signal fed into transmitter 407 (data out to decoder). MUX 406 is driven by the clock signal out of AND gate 417.

When all 8 bits are shifted out of 8-bit shift register 419, 3bit down counter 416 has counted to zero. This then triggers a load of shift register 419 with new data from FIFO memory 418. FIFO memory 418's output enable is triggered by counter 416 and a reload of 7 from 415 (3-bit parallel latch) to counter 416. Lastly, once counter 414 counts down to 0, it reloads from latch 413, shift registers 402 and 405 are then loaded from parallel latches 401 and 404, respectively (processing of the next 132-byte record begins).

Figure 5:
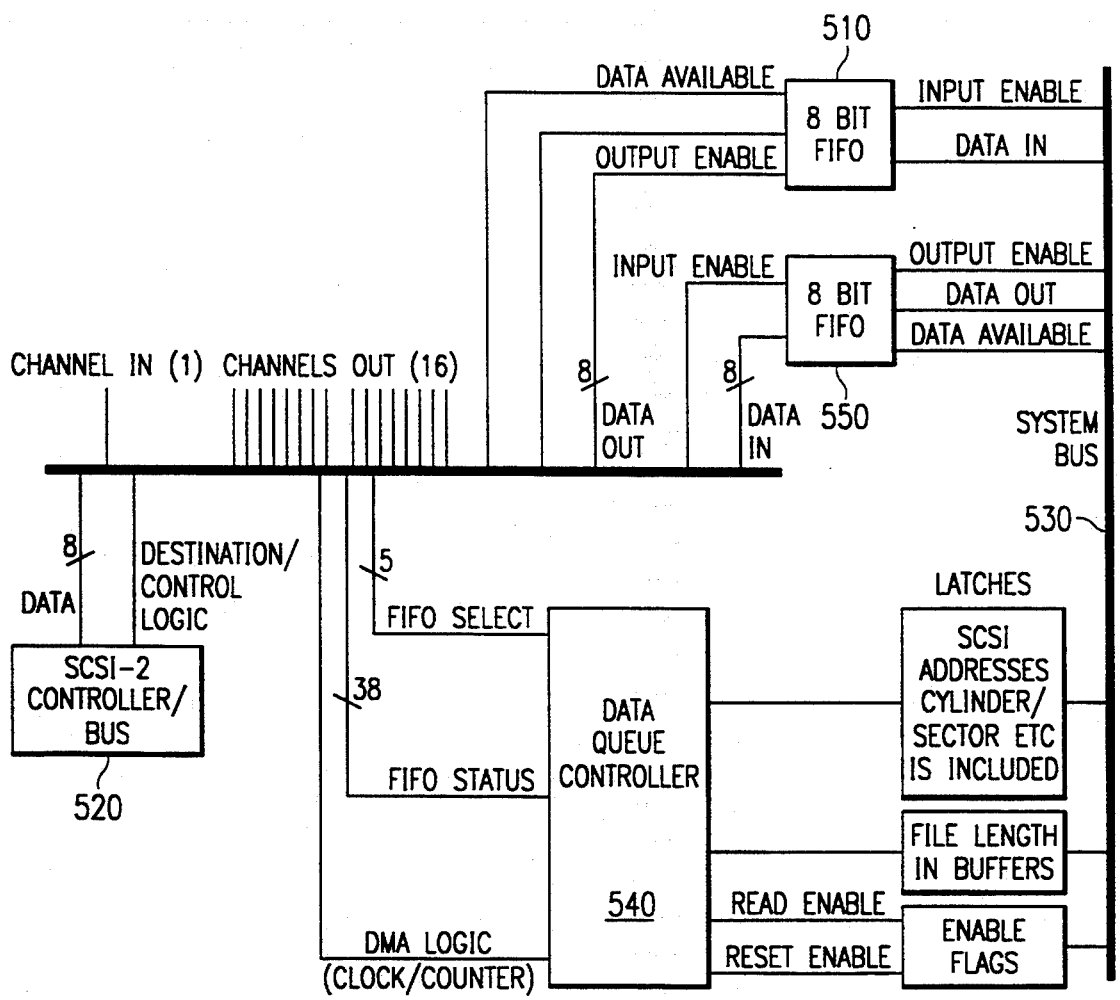
FIG. 5 is a schematic data queue controller circuit diagram according to an embodiment of the present invention.

FIG. 5 shows an illustrative schematic circuit drawing of a data queue controller and its environment according to a preferred embodiment. As remarked earlier, data queue controller 540 manages all of the ports/channels of the communications board, servicing each of them in a round-robin fashion. The channels are time sliced so each channel has the opportunity to move data to SCSI-2 bus 520. The maximum number of channels is determined by the throughput of SCSI-2 bus 520. Moreover, the size of FIFO buffer 510,550 is determined by the optimal service time of data queue controller 540, which assumes all channels are active at 3.3 Mbits/s and the data running on all channels is continuous (no FIFO starvation or overflow). Thus, by associating adequate memory buffers 510,550 with each data channel, data queue controller (processor) 540 services all of the data channels in a continuous loop without any of the channels starving for data or overflowing. This means reliable data transfer at greatly increased speeds.

Data queue controller 540, which is preferably an onboard microprocessor with firmware residing in an PROM, is not only responsible for maintaining data to/from the output/input channels, but is also responsible for controlling SCSI-2 bus 520 and, as a result, is the primary contributor to the on-demand capability of the present invention.

As can be seen, SCSI-2 controllers (hard disk interface) 520 is preferably located directly on the communications board. This is due to the high data rates and total bus bandwidth required to sustain these data transfer rates on all channels simultaneously. Putting controllers 520 directly on the communications board eliminates low bandwidth PC system bus 530 as a data transfer bottleneck (as explained earlier), and also allows the use of an inexpensive PC motherboard and operating system.

Specifically, one way to accomplish the control flow as managed by data queue controller 540 is as follows:

```
channel = 1
LOOP
    IF Channel Enable Flag Set THEN
        IF Channel FIFO Has Enough Data THEN
            Load Destination [3-19]/Source[1-2] Address
            Access Control of SCSI
            Send Data Buffer (from FIFO of that channel)
            Inc. file size count (of that channel)
            IF file size count = File Length THEN
                Channel Enable Flag = FALSE
            ENDIF
        ENDIF
    ENDIF
    Next Channel [1-19]
    If Channel > last channel (19) THEN channel = 1
END LOOP
```

With all conditions TRUE, and N=the MAXIMUM number of channels on the card (e.g., 19 in one embodiment), then the maximum time data queue controller 540 is in one loop is SCSI throughput/N. This assumes all channels are running at 3.3 Mbits/s and none of the FIFO's become starved or overflowed (i.e., data queue controller 540 is operating). Obviously, if a channel is running at 6.6 Mbits/s, then another channel would not be able to maintain the proper throughput.

Data queue controller 540, however, preferably controls all aspects of data transfers between the SCSI ports and RS-422 channels including resetting individual channel circuits, formatting the SCSI drive, recording bad block address, and skipping or remapping them when moving data. Management is provided to data queue controller 540 by commands from the control program via system bus 530. Data queue controller polls each of the latches (for example, enable flags, file length in buffers, and SCSI addresses) for directions from the control program during operation. Essentially data transfer is managed by data queue controller 540 as follows:

```
Do While True
    Poll system bus for new commands
    If data present then
        process new commands
    endif
    Poll input FIFO
    If data present then
        Send address and size of block to SCSI ctrl
        Transfer block from input FIFO to SCSI disk
        Update internal counters
    endif
    Poll ISA input FIFO
    If data present then
        Send address and size of block to SCSI ctrl
        Transfer block from ISA input FIFO to SCSI disk
        Update internal counters
    endif
    Poll ISA output FIFO
    If data present then
        Send address and size of block to SCSI ctrl
        Transfer block from SCSI disk to ISA output FIFO
        Update internal counters
    endif
    Channel_Number = 1
    Do while Channel_Number <=Output_Channels_per_Board
        Poll Output FIFO (Channel_Number)
        If data present then
            Send address and size of block to SCSI ctrl
            Transfer block from SCSI disk to output FIFO
            Update internal counters
        endif
        Channel_Number = Channel_Number + 1
    endwhile
    Poll SCSI Controller for problems (status)
    If problem or status to report then
        correct or notify Control Program
    endif
endwhile
```

Control program. The control program runs on the host computer. It communicates with the communications circuit board via the system bus. As noted above, the control program tells the board to send or receive a designated file, its length, its storage scheme, and where to route it (output port/channel). In addition to the activities attributed it throughout the discussion above, the control program also may direct the communications board to wait for more data or reset an input or output port for a new transmission. The control program can inquire as to a channel/port's status (busy, current record, idle time since last record received/sent), as well as to SCSI status/problems (i.e., drive not responding, drive performance below expected level, drive with too many bad blocks). Moreover, the control program can issue a reformat of a drive.

Specifically regarding data flow, the control program determines that fixed length (e.g., 132 byte) records contain no record count or checksum. Similarly, with regard to variable length records, the control program determines that such records each contain a record count and a checksum. Either way, as noted earlier, the control program provides the communications board with the record length as well as the record bit mask which determines what data to discard.

Aspects of the software process flow of the control program can be seen from the following control program pseudocode. In this example, the control program has been requested to play a desired movie.

```
Do Initialization
    Setup Input Port (Command_File_Pass_1)
    Setup Input Port (Command_File_Pass_2)
    Setup Input Port (Data_File_Pass_1)
    Setup Input Port (Data_File_Pass_2)
Poll Card Status (output channels, drives)
Set Last_Command = Command_File_Pass_1
Do While TRUE
    Poll Input Port (Command_File_Pass_1)
    Poll Input Port (Command_File_Pass——2)
    Poll Input Port (Data_File_Pass_1)
    Poll Input Port (Data_File_Pass_2)
    If data present on input port then
        If Last_Command = Command_File_Pass_1 then
            Setup Input Port (Command_File_Pass_2)
        else if Last_Command = Command_File_Pass_2 then
            if good data then
                Process Command File
            endif
            Setup Input Port (Data_File_Pass_1)
        else if Last_Command = Data_File_Pass_1 then
            Setup Input Port (Data_File_Pass_2)
        else if Last_Command = Data_File_Pass_2 then
            if good data then
                Process Data File
            endif
            Setup Input Port (Command_File_Pass_1)
        endif
    endif
    Poll control host for movie request
    If movie request present then
        If no capacity problem then
            Setup Output Port
            Start Movie
        endif
    endif
    Poll control host for movie status change
    If movie status change present then
        Process movie status change
    endif
    Poll Card Status (output channels, drives)
    If problem then
        notify control host
    endif
    If file transfer between subsystems requested then
        process file transfer (disk copy)
    endif
endwhile
```

As can be seen, the communications board maintains the status of each file (data and command) which the control program polls. If desired, the board could also generate an interrupt to the system bus for the control program when a file is complete. Moreover, the control program software maintains an "ordered" serial I/O channel in-process queue, sorted in the order that each serial I/O channel commences operation.

Thus, according to the present system and method, movies can be changed overnight versus the once-a-month timetable previously dictated by the cost involved in duplicating and distributing videotapes and movie cards. The present system and method can be used in the lodging industry and may also be used in broader applications such as pay-per-view and interactive services in such new locations as hospitals, corporations, apartments and schools, even entire cities.

The specific application discussed above to illustrate the present invention is for a store and forward system and method for on demand delivery of a specific video entertainment product (movie videos). Another example application includes uses of the present invention in the vein of electronic news gathering. For example, a news correspondent in Beirut takes some video footage of an event. The correspondent would use the present invention to store the footage on his PC, transmit it back by, for example, standard telephony or satellite, to the news desk in Washington. The editor in Washington can then play/replay the footage to review it for newsworthy content and, assuming he decides to use some or all of the footage for the upcoming newscast, record and/or playback the footage using traditional television techniques (i.e., tape decks, switches and modulators, etc.), or if he decides not to use it now, store it as archival footage.

Yet another application would include bringing audio/video source material back from a distant and probably international location without concern for transmission time, or if normal facilities are not available (e.g., such as telephones at a disaster area). Using the system and method of the present invention, one can store the material in real time and then transmit it, as well as recapture it, later to save even more on transmission costs and/or accommodate bandwidth availability. An example of cost reduction would include using the telephone lines when they were less busy (and expensive), or a satellite when it had available (inexpensive) time to transmit the audio/video material-bearing signal. Another example would be to transmit the material at a slower (more inexpensive) data rate.

A further application would include employing the present system and method for commercial insertion. Before or after a program, or between programs, commercials or announcements could be inserted by an external command to the workstation to receive and play an incoming commercial or announcement (or play one already stored in DASD). An example could be a tornado or hurricane warning (announcement) for certain areas which could be inserted into a program in progress.

Numerous modifications and alternate embodiments of the invention will occur to those skilled in the art. Accordingly, it is intended that the invention be limited only in terms of the following claims.

We claim:

1. A system for storing and forwarding audio/video signals on demand, comprising:
   an encoder for receiving at least one of said audio/video signals, digitizing each of said received at least one audio/video signal, and compressing said digitized signal into a data stream;
   a first processing system for receiving said data stream from said encoder, further compressing said data stream, storing said data stream in a first storage media, and later transmitting said data stream from storage;
   a transmitting system for receiving said data stream from said processing system and transmitting same to a location remote from said processing system;
   a second processing system including a microprocessor for receiving said data stream from said transmitting system, processing said data stream, storing said data stream in a second storage media, and, upon receipt of a request for replay of said at least one audio/video signal later transmitting a copy of said data stream from such storage media after decompressing said copy of said data stream; and
   a decoder for receiving said data stream copy from said storage media, further decompressing said data stream copy and transforming said decompressed data stream copy into an analog signal for transmission to at least one television set for replay.

2. The system for storing and forwarding audio/visual signals on demand of claim 1, wherein said first and second storage media are random access mass storage media.

3. The system for storing and forwarding audio/video signals on demand of claim 1, wherein said transmission by said second processing system is synchronous replay to said decoder.

4. The system for storing and forwarding audio/video signals on demand of claim 1, wherein said request for replay of said analog signal is from another processing system.

5. The system for storing and forwarding audio/video signals on demand of claim 1, wherein said request for replay of said analog signal is from a program running simultaneously on said second processing system.

6. The system for storing and forwarding audio/video signals on demand of claim 1, wherein said decompressing by said second processing system is rebuilding of said copy of said data stream.

7. The system for storing and forwarding audio/video signals on demand of claim 1, wherein said compressing by said first processing system is stripping off network overhead from said data stream.

8. The system for storing and forwarding audio/video signals on demand of claim 7, wherein said network overhead includes forward error correction and addressing information.

9. The system for storing and forwarding audio/video signals on demand of claim 1, wherein said second processing system further comprises a communications board for enabling direct data transfer from said storage media to said decoder.

10. The system for storing and forwarding audio/video signals on demand of claim 9, wherein said communications board bears a data queue controller for managing input, output and system channels of said communications board.

11. The system for storing and forwarding audio/video signals on demand of claim 10, wherein said data queue controller ensures buffers in all output channels of said communications board are timely filled during transmission to prevent under- or over-filling of a channel.

12. The system for storing and forwarding audio/video signals on demand of claim 1, wherein said first processing system further comprises a communications board for enabling direct data transfer from said encoder to said storage media.

13. The system for storing and forwarding audio/video signals on demand of claim 12, wherein said communications board bears a data queue controller for managing input, output and system channels of said communications board.

14. The system for storing and forwarding audio/video signals on demand of claim 1, wherein said first processing system further includes a microprocessor.

15. A system for storing and forwarding analog signals on demand, comprising:
   an encoder for receiving at least one of said analog signals, digitizing each of said received at least one analog signal, and compressing said digitized signal into a data stream;
   a first processing system for receiving said data stream from said encoder, further compressing said data stream, storing said data stream in a first storage media, and later transmitting said data stream from storage;
   a transmitting system for receiving said data stream from said processing system and transmitting same to a location remote from said processing system;
   a second processing system including a microprocessor for receiving said data stream from said transmitting system, processing said data stream, storing said data stream in a second storage media, and, upon receipt of a request for replay at least one of said analog signal later transmitting a copy of said data stream from such storage media after decompressing said copy of said data stream; and
   a decoder for receiving said data stream copy from said storage media, further decompressing said data stream copy and transforming said decompressed data stream copy into an analog signal for transmission to at least one presentation system for replay.

16. The system for storing and forwarding analog signals on demand of claim 15, wherein said first and second storage media are random access mass storage media.

17. The system for storing and forwarding analog signals on demand of claim 15, wherein said transmission by said second processing system is synchronous replay to said decoder.

18. The system for storing and forwarding analog signals on demand of claim 15, wherein said request for replay of said analog signal is from another processing system.

19. The system for storing and forwarding analog signals on demand of claim 15, wherein said request for replay of said analog signal is from program running simultaneously on said second processing system.

20. The system for storing and forwarding analog signals on demand of claim 15, wherein said decompressing by said second processing system is rebuilding of said copy of said data stream.

21. The system for storing and forwarding analog signals on demand of claim 15, wherein said compressing by said first processing system is stripping off network overhead from said data stream.

22. The system for storing and forwarding analog signals on demand of claim 21, wherein said network overhead includes forward error correction and addressing information.

23. The system for storing and forwarding analog signals on demand of claim 15, wherein said second processing system further comprises a communications board for enabling direct data transfer from said storage media to said decoder.

24. The system for storing and forwarding analog signals on demand of claim 23, wherein said communications board bears a data queue controller for managing input, output and system channels of said communications board.

25. The system for storing and forwarding analog signals on demand of claim 24, wherein said data queue controller ensures buffers in all output channels of said communications board are timely filled during transmission to prevent under- or over-filling of a channel.

26. The system for storing and forwarding analog signals on demand of claim 15, wherein said first processing system further comprises a communications board for enabling direct data transfer from said encoder to said storage media.

27. The system for storing and forwarding analog signals on demand of claim 26, wherein said communications board bears a data queue controller for managing input, output and system channels of said communications board.

28. The system for storing and forwarding analog signals on demand of claim 15, wherein said first processing system further includes a microprocessor.

29. The system for storing and forwarding analog signals on demand of claim 15, wherein said presentation system is a television set.

30. The system for storing and forwarding analog signals on demand of claim 15, wherein said presentation system is a multimedia platform.

31. The system for storing and forwarding analog signals on demand of claim 15, wherein said multimedia platform permits interaction with a user.

32. The system for storing and forwarding analog signals on demand of claim 15, wherein said presentation system is an audio speaker.

33. The system for storing and forwarding analog signals on demand of claim 15, wherein said analog signals are a multimedia production.

34. The system for storing and forwarding analog signals on demand of claim 15, wherein said analog signals are an audio/video program.

35. The system for storing and forwarding analog signals on demand of claim 15, wherein said analog signals are an audio-only presentation.

36. The system for storing and forwarding analog signals on demand of claim 15, wherein said analog signals are a conference video with associated program audio.

37. The system for storing and forwarding analog signals on demand of claim 15, wherein said analog signals are a video-only presentation.

38. The system for storing and forwarding analog signals on demand of claim 15, wherein said analog signals are a television program.

39. The system for storing and forwarding analog signals on demand of claim 15, wherein said analog signals are a commercial.

40. The system for storing and forwarding analog signals on demand of claim 15, wherein said analog signals are video footage.

41. The system for storing and forwarding analog signals on demand of claim 15, wherein said second processing system inserts additional programming at predetermined locations within said analog signal during said transmission of said analog signal to at least one presentation system for replay.

42. The system for storing and forwarding analog signals on demand of claim 15, wherein said additional programming is a commercial.

43. The system for storing and forwarding analog signals on demand of claim 15, wherein said additional programming is an announcement.

44. The system for storing and forwarding analog signals on demand of claim 15, wherein said presentation system is a cable television distribution system.

45. The system for storing and forwarding analog signals on demand of claim 15, wherein said presentation system is a fiber optic link.

46. The system for storing and forwarding analog signals on demand of claim 15, wherein said presentation system is a VCR.

* * * * *